United States Patent [19]
Fischer

[11] Patent Number: 5,299,745
[45] Date of Patent: Apr. 5, 1994

[54] PROCESS FOR THE PREPARATION OF A DRY AGGREGATE FOR THE PRODUCTION OF ELECTRODES

[75] Inventor: Werner Fischer, Venthône, Switzerland

[73] Assignee: R + D Carbon Ltd., Sierre, Switzerland

[21] Appl. No.: 905,790

[22] Filed: Jun. 29, 1992

[30] Foreign Application Priority Data

Jul. 3, 1991 [CH] Switzerland .................. 01961/91

[51] Int. Cl.$^5$ .................. B02C 23/10; B02C 23/14
[52] U.S. Cl. .................. 241/24; 241/29
[58] Field of Search .................. 241/24, 22, 17, 23, 241/29

[56] References Cited

U.S. PATENT DOCUMENTS

| | | | |
|---|---|---|---|
| 4,231,790 | 11/1980 | Hahn et al. | 241/23 |
| 4,897,170 | 1/1990 | Chandramouli | 204/294 |
| 4,968,481 | 11/1990 | Rerat | 241/17 |
| 5,110,056 | 5/1992 | Blasczyk et al. | 241/19 |

Primary Examiner—Mark Rosenbaum
Assistant Examiner—John M. Husar
Attorney, Agent, or Firm—Bachman & LaPointe

[57] ABSTRACT

The preparation of carbonaceous dry aggregates for the production of electrodes requires, for electrode plants, extensive and expensive silo installations in order for dry substances to be processed and stored in a discrete manner until they are mixed. For that purpose, in relation to known preparation processes it is difficult to maintain given granulometry lines. The invention proposes a preparation process which requires a small number of small silos and involves mixing and grading procedures with which granulometries are simple to adjust and can be kept within narrow tolerance ranges.

23 Claims, 2 Drawing Sheets

PROCESS FOR THE PREPARATION OF A DRY AGGREGATE FOR THE PRODUCTION OF ELECTRODES

BACKGROUND OF THE INVENTION

The invention relates to a process for the preparation of a dry aggregate for the production of electrodes.

Electrodes, for example anodes, for aluminum electrolysis, are produced from various solid and liquid carbonaceous starting materials by mixing, shaping and baking. The solid starting materials used are petroleum coke, baked and green and scrap electrode residues.

Baked electrode residues are anode residues which are recycled from the aluminum electrolysis operation and scrap from baked anodes, while green scrap occurs as waste after an electrode shaping operation and prior to the calcination or baking operation. The solid starting materials are processed in anode plants by crushing, screening or sieving and mixing to provide a granular dry substance which is subjected to further processing in mixing equipment, therein mixed with liquid binder material, generally pitch, to provide what is known as green anode material. Anodes for example are formed from the green anode material and then calcinated or baked.

In a known process for the production of a granular dry substance, crushed, baked anode residues are sieved out and stored as coarse grain in silo batteries. Petroleum coke is sieved out together with the undersize grain of the baked residues, and stored as middle grain in silos. The oversize grain which is produced in that sieving operation is crushed up and recycled while the undersize grain and the overflow material is processed in a mill to produce dust and is stored as such in a silo battery.

Coarse grain, middle grain and dust are individually withdrawn from the silos of the silo batteries by means of discharge equipment, mixed and fed to metering silos. From there the discharge is metered by way of a weighing apparatus together with granular green scrap, and mixed with pitch in kneading equipment.

In another known process, petroleum coke, baked and green anode scrap are accommodated separately in storage silos. Petroleum coke and pre-broken, baked scrap, downstream of intermediate silos, are mixed, broken and divided up by means of sieving machines into coarse, medium and fine fractions, and introduced into corresponding fraction silos. Coarse and fine mills crush the overflow material from the fraction silos for the coarse and medium grain. Undersize grain and possibly also overflow material from the fraction silos for medium and fine grain are processed in a mill to produce dust which is also passed into silos. Downstream of the fraction silos, by way of weighing equipment, the dry substance fractions, petroleum coke, baked scrap and dust are passed by way of a preheating screw and are then fed with green residues and liquid pitch pursuant to recipe provisions directly into kneading equipment.

What is common to both processes is a componentization operation, that is to say, the separate storage of the starting materials in storage silos and the dry substance components, which are made from the starting materials, in fraction silos, and gravimetric measurement of the proportions of dry substance which are intended for the mixing procedure. That componentization operation requires expensive large-scale silo equipment, both on the starting material side and on the fraction side, as well as expensive weighing equipment for each fraction.

Particular requirements in respect of quality of materials are mandatory for anodes for the aluminum electrolysis, and such requirements can be met only if the starting materials already correspond to those requirements. In the known processes, the effects of fluctuations in the levels of quality of the starting materials can only be compensated in that, in the first known process, additional silos are to be provided in the batteries of fraction silos while in the latter process, further storage silos are to be provided for starting materials of different qualities, in which case starting materials of constant average quality can be produced from the contents of the further storage silos by mixing thereof by means of additional mixing equipment.

The proportions of the starting materials for green paste are set in accordance with given compositions, which include material and geometry, that is to say grain sizes and grain size components of the starting materials. Maintaining the appropriate composition by means of the known processes is an expensive method, because of the separate preparation of the constituents of the dry material, silo storage thereof with segregation phenomena which occur as a result, and by virtue of the fraction of the green residues being brought together with the other materials, upstream of the mixing equipment, together with the gravimetric measuring operation. It has also been found that the granulometry fluctuates within wide limits around a predetermined target line.

SUMMARY OF THE INVENTION

On that basis, the inventor set himself the object of providing a process for the preparation of a dry aggregate for the production of electrodes, in particular anodes for aluminum electrolysis, which process can be operated on the starting material side (dry substances upstream of sieving machines) without large-scale silos and on the fraction side (dry substances downstream of sieving machines) with inexpensive small-scale silos without weighing equipment automatically compensates for fluctuations in the quality of the starting materials without additional equipment, and which in a simple manner makes it possible to keep to the composition of the dry aggregate, avoiding deviations from a predetermined granulometry target line.

That object is attained by the present invention.

To attain the object in accordance with the invention, a different path is followed for the preparation of a dry aggregate for the specified purpose, in comparison with the state of the art. Petroleum coke, baked and green anode scrap are each divided into at least two grain fractions and mixed, wherein the fractions are again combined to form a fraction in the starting material mixture. That starting material mixture, in accordance with the invention, is then divided into individual fractions so that each fraction comprises a mix of petroleum coke, baked and green electrode scrap.

With the operating procedure of the process according to the invention, there are no large-scale silos on the starting material side and on the fraction side small-scale silos (capacities of up to 15 metric tons) can be used without weighing equipment. Fluctuations in quality are automatically compensated without additional equipment, and the composition specification is restricted to grain size quantitative proportions so that it is possible to keep the intended granulometry target lines within narrower limits than with the state of the art processes.

BRIEF DESCRIPTION OF THE DRAWINGS

Further advantages, features and details of the process according to the invention are to be found in the following description of a preferred embodiment and the drawing in which.

DETAILED DESCRIPTION OF PREFERRED EMBODIMENTS

Figure 1:
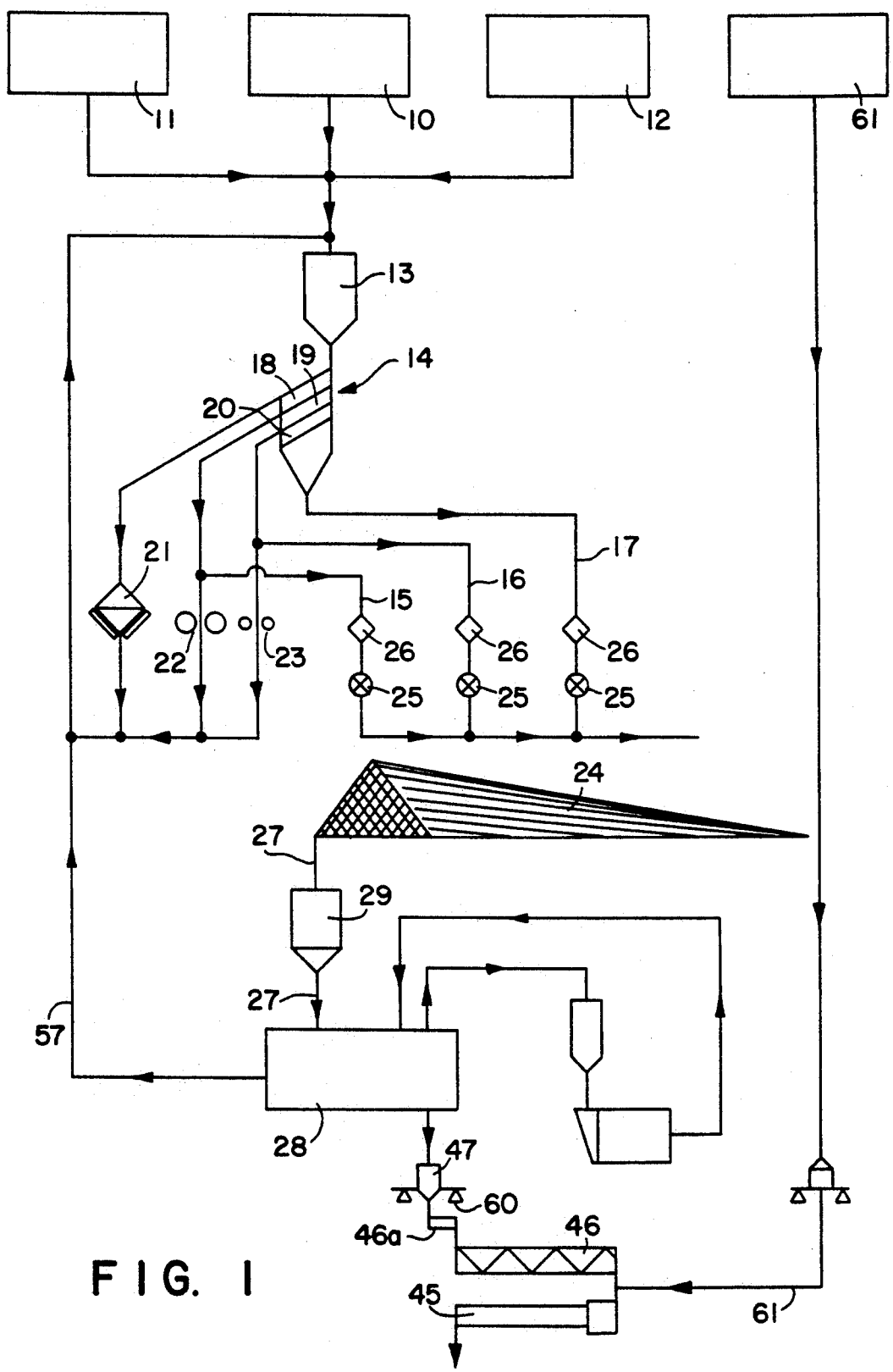
FIG. 1 is a diagrammatic view showing the operating procedure of the process according to the invention.

As shown in FIG. 1, petroleum coke, baked and green electrode residues, upon being delivered to an anode plant, are each individually processed to provide a feed 10 for petroleum coke, a feed 11 for baked scrap and a feed 12 for green scrap of a first grain size range. A grain size range of from 0 to 40 mm and 0 to 25 mm is preferred for petroleum coke and a grain size range of from 0 to 80 mm and 50 mm is preferred for baked and green scrap.

Prepared petroleum coke from the feed 10, and baked and green scrap from the feeds 11 and 12 are successively individually drawn in any sequence from the feed arrangements and divided into at least two fractions of smaller grain size ranges than the initial grain size ranges of the petroleum coke and the scrap. For the production of anodes for the aluminum electrolysis, preferably petroleum coke, baked and green scrap (hereinafter also referred to as dry aggregate) are divided into three fractions, more specifically into a coarse fraction 15 with grains of a size of from 16 to 6 mm, a middle fraction 16 with grain sizes of from 6 to 2 mm and a fine fraction 17 with grains of a size of from 2 to 0 mm, that is to say, grain sizes which already substantially correspond to that of the final granulometry of the anodes.

For that purpose, the dry substances are conveyed into a continuous-flow silo 13 and passed by way of sieving or screening machines 14 which divide the dry substances into the three fractions by way of coarse, medium and fine sieves of sifters as indicated at 18, 19 and 20 respectively. The oversize grain, which overflows the sieves 18, 19 and 20, of the coarse fraction 15, middle fraction 16 and fine fraction 17 is passed to crushing equipment, the oversize grain of the coarse fraction 15 is passed to crushes 21, and that of the middle and fine fractions 17 and 18 are passed to roll crushing mills 22 and 23 which crush the respective oversize grain to provide a crushed material with grains of a size which is capable of being sieved off. For the fresh operation of sieved off, that is to say the operation of division into the three fractions 15, 16 and 17, the crushed materials are fed to the continuous flow silo and there added to the dry material mass flow which is respectively going to the fractional division step. The sieved-off coarse fraction 15, middle fraction 16 and fine fraction 17, before passing into the mixing apparatus 24, are monitored in regard to their chemical composition and quantitive yield; for that purpose, provided at their conveyor apparatuses between the sieving machine 14 and the mixing apparatus 24 are sampling devices 25 for the chemical composition and quantitative measuring apparatuses 26 for the quantitative yield.

In accordance with the invention the dry substances are mixed in a mixing apparatus 24, the mixing operation for the dry aggregate, the coarse fractions 15, middle fractions 16 and fine fractions 17 preferably being effected by means of a blending bed mixing operation. For effecting the blending bed mixing operation, preferred is a Chevron or Windrow type blending bed which bring various mixing materials together to provide a mixed material of homogenous composition, by virtue of given feed configurations, charging phase and removal from the feed arrangements.

Mixing and homogenization of the dry substances in the blending bed make the process according to the invention independent of the sequence in which the dry substances are supplied and insensitive in relation to the effects of fluctuations in the qualities of the dry aggregate so that there is no need for additional items of equipment for receiving and mixing dry substances of different qualitities, in order to set an average quality in respect of the dry aggregates. From the mixing apparatus 24, the mixed material 27, of a grain size of from 16 to 0 mm, according to the needs of a grading equipment 28, is introduced in a batch-wise manner into a mass flow silo 29 and from there passed to the grading equipment 28.

Figure 2:
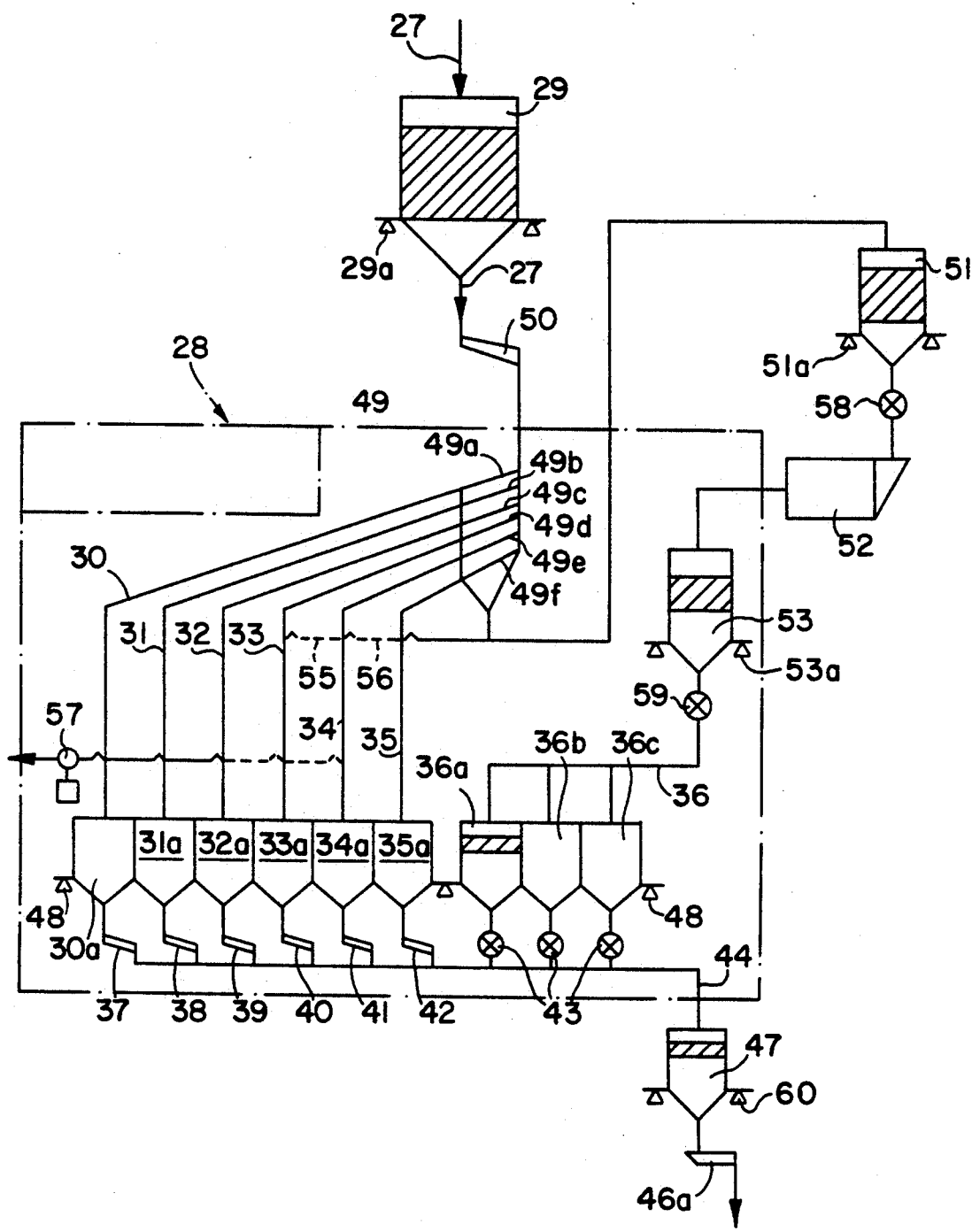
FIG. 2 is a diagrammatic view of the classifying operation according to the invention as part of the diagrammatic view illustrated in FIG. 1.

In the continuously operating grading equipment 28 shown in FIG. 2, the mixed material 27 is divided up, to produce a mixture comprising at least two defined grain fractions. Preferably, in accordance with the invention, the material is to be divided up into seven fractions, a first fraction 30 with a grain size of 16-8 mm, a second fraction 31 with a grain size of 8-4 mm, a third fraction 32 with a grain size of 4-2 mm, a fourth fraction 33 with a grain size of 2-1 mm, a fifth fraction 34 with a grain size of 1-0.5 mm, a sixth fraction 35 with a grain size of 0.5- 0.25 mm and a dust fraction 36, those fractions being accommodated in metering or dispensing silos 30a to 36c. From the silos 30a to 35a, the respective fractions are discharged onto a feeder 44 by way of conveyor devices 37 to 42, for example screws or conduits, and dust is discharged by way of rotary valves 43 from the silos 36a to 36c onto the feeder 44, those materials are then passed to a filling level weighing apparatus 47 with filling level indicators 60, and from there passed to a mixer 45 by way of a conveyor 46a and a preheating apparatus 46 for the dry aggregate. The silos 30a to 35a each co-operate with load cells 48 or similar bin level indicators which indicate when a metering silo is full and how much was discharged by way of the conveyor apparatuses 37 to 42 from the metering silos corresponding to their speeds of rotation or frequencies, per unit of time.

With knowledge of the weight losses per unit of time, the discharge capacities for a discharge from an individual silo are set for adjustment of a composition formed from all silo contents, that is to say a grain mix of a defined grain distribution, to which dust is then added. For the final production of the green paste (from which will be formed an anode to be baked), pitch 61 is added to that mixture when it passes into the mixing apparatus.

The through-put through the grading apparatus 28, from the mass flow silo to the mixer 45, is also regulated by the filling level weighing apparatus 47 in that, when the filling level falls below a certain level, the discharge capacities of the feeders 37 to 42 and the rotary valve positions 43 are increased, by way of a proportional regulation effect, by means of an increased yield (by increases in the speed of rotation or an increase in frequency, or enlarged control valve openings), until the proper filling level is regained, so that the mixer 45 is continuously supplied with the same amount. If the filling level rises above a predetermined value, the proportional regulating system regulates the quantitative yield in the opposite direction.

In contrast to the gravimetric measuring operation which is known from the state of the art, the invention provides that measurement of the dry aggregate proportions which are intended for mixing is effected volumetrically by adjustment of the conveyor outputs of the continuously conveying feeders 37 to 42 and rotary valves 43. Granulometry lines can be kept within close limits by virtue of the operation according to the invention of fractioning the mixed material 27 in the grading apparatus 28, in conjunction with volumetric measurement.

Division of the material 27 in the grading apparatus 28 is effected starting from the mass flow silo 29 with a discharge apparatus 50 by way of a sieving machine 49 whose sieves 49a (grain size 16–8 mm), 49b (grain size 8–4 mm), 49c (grain size 4–2 mm), 49d (grain size 2–1 mm), 49e (grain size 1–0.5 mm) and 49f (grain size 0.5 to 0.25 mm) divide the material 27 into the fractions 30 to 35 and pass them to the metering silos 30a to 35a of a capacity of from 0.5 to 15 metric tons, preferably from 2 to 4 metric tons.

As can be seen from FIG. 2, the undersize grain of the fraction 35 (grains smaller than 0.25 mm) are passed to a mill storage bin 51, to a mill 52 for processing the undersize grain to produce dust 36, from there in a homogenisation bin 53 and from there to the metering silos 36a to 36c, of approximately the same capacity as the silos 30a to 35a, for mill dust. If there is an increased dust requirement, then mixed material of the fraction 33 and/or 34, which is sieved off by change-over switching devices 55 and 56 disposed between the metering silos 33a and 34a and the sieves 49d and 49e can be passed together with the fraction 35 to the mill 52.

For the purposes of keeping the six dry substance fractions ready, the metering silos 30a and 35a are continuously fed in an overflow condition (degree of filling of 100%) with their grain size fractions 30 to 35, while the overflow 57 which is not required for filling the metering silos is discharged from the grading apparatus 28 and passed to the mixing apparatus 24 by way of the continuous flow silo 13. In regard to the overflow 57 there is therefore a continuous circuit which promotes mixing and homogenization of the fractions in the blending bed. If a degree of filling of less than 100% is indicated by way of the load cells or pickups 48 for individual metering silos, the discharge apparatus 50 ist set to a higher level of discharge capacity until corresponding metering silos are again 100% filled and are kept in an overflow condition, while the overflow 57 which is not required, from the grading apparatus 28, is fed to the mixing apparatus 24 as described above.

The mass flow silo 29 has load cells 29a, the mill storage bin 51 is provided with load cells 51a, the homogenisation bin 53 co-operates with load cells 53a and the preferably three-part metering silo 36a to c is provided with load cells 48. The load cells 51a, 53a and 48 show upper filling levels and lower filling levels in the corresponding bins and silos. In normal operation the mill storage bin operates with for example maximum and minimum filling levels of 80% and 40% respectively.

If the filling level falls due to an excessively low undersize grain yield from the sieves 49f, the overflows of the fractions from the sieves 49d and 49e are passed to the fraction 49f by suitable setting of the change-over switching devices 55, 56 and passed into the mill storage bin 51 until in the bin 51 the upper filling level of 80% is regained, at the same time the discharge apparatus 50 being set to a higher discharge capacity. The mill 52 then has available crushing material of the fraction consisting of grains of 2 mm and smaller in the mill storage bin 51 for grinding up to provide mill dust which flows to the mill by way of an adjustable discharge control valve 58. Arranged downstream of the mill 52 is the homogenization bin 53 which continuously feeds into the metering silo 36 by way of a discharge control valve 59. The filling levels of the homogenisation bin 53, for example an upper level of 90% and a lower level of 60%, determine the feed flow and operation of the mill 52 by way of adjustment of the quantitative flow of crushing material through the discharge control valve 58 to the mill 52, for grinding and transfer of ground material into the homogenisation bin 53.

If the filling level in the homogenization container rises for example from 60% (normal operation) to 80%, the crushed material yield from the mill storage bin 51 is reduced for example by 10% by way of the discharge control valve or lock device 58. If, with such a reduction, the filling level rises further to the upper value, the mill 52 is stopped until the lower filling level of 60% is regained. When the mill 52 starts, the feed to the mill is increased by 10% until an intermediate value, for example 80% of the filling level, is reached. Before the mill 52 is stopped, suitable steps are taken, that is to say the change-over switching devices 55, 56 are switched over and the overflow from the sieves 49d and e is passed to the mixing bed 54 to lower the filling level of the mill storage bin to the lower filling level, that being done in order to receive the amounts of grain of smaller than 0.25 mm, which fall through the sieve 49f.

The metering silo for mill dust 36 preferably includes three bins 36a, b and c, wherein the bins b and c are constantly kept 100% filled. The filling levels of the bin 36a are controlled by way of the discharge control valve 59 between the metering silo and the homogenization bin 53. In normal operation the bin 36a operates with a filling level of at least 60% and at most 80%. If the filling level rises from 60% towards 80%, the feed by way of the discharge control valve 59 is reduced, it is interrupted in the event of a rise above 80% until 60% is regained, and it is then restored.

While the grain side, that is to say the six fractions 30a to 35a, is continuously operated in an overflow mode, the dust side, the fraction 36, is however continuously operated in a discrete-need mode, in that an actual quantitative dust need is produced and kept ready for further mixing without excess amounts of dust having to be passed to the blending bed. As described, this is achieved by way of the mill storage bin 51 which draws certain fractions on the grain side as required, and the homogenisation bin 53 co-operating by way of the mill 52 with the mill storage bin 51 on the one hand and the metering silo for mill dust on the other hand, which bins, by way of mutually matched filling level indications, with corresponding settings of the discharge control valves or lock devices 58, 59, ensuring a constant supply of dust and detecting and compensating for fluctuations in the dust requirement in the bin system, so that for the purposes of setting an anode material composition, besides the six grain fractions which are provided in accordance with the invention, the seventh fraction, the dust fraction, is also processed in such a way that it is continuously available in a requirement-discrete fashion.

I claim:

1. A process for the preparation of a dry aggregate for the production of electrodes, in particular anodes for aluminum fusion electrolysis, comprising:

individually processing petroleum coke and baked and green electrode scrap to provide feeds of these materials having a predetermined grain size;

dividing said feeds into at least two grain size fractions;

feeding said grain size fractions to mixing equipment which forms a mixture therefrom of grain size fractions of petroleum coke and baked and green electrode scrap;

feeding the mixture from the mixing equipment and dividing same by means of a grading apparatus into at least two mixture grain size fractions; and mixing said mixture grain size fractions to provide a dry aggregate.

2. A process according to claim 1 wherein the petroleum coke is individually processed to provide a predetermined grain size of from 0 mm to 40 mm.

3. A process according to claim 2 wherein the baked and green scrap are individually processed to provide a predetermined grain size of from 0 mm to 80 mm.

4. A process according to claim 3 wherein said feeds are divided into three grain size fractions, being respectively coarse, medium and fine.

5. A process according to claim 4 wherein the grain size ranges of the coarse fraction are from 16 mm to 6 mm, those of the medium fraction are from 6 mm to 2 mm, and those of the fine fraction are from 2 mm to 0 mm.

6. A process according to claim 4 wherein the operation of dividing said feeds into at least two grain size fractions is effected by sieving.

7. A process according to claim 6 wherein the operation of dividing said feeds produces oversize grain, which is crushed and passed to a feed flow to the operation of dividing said feeds.

8. A process according to claim 6 including the step of mixing said grain size fractions in a blending bed to form a mixture of grain size fractions.

9. A process according to claim 8 wherein said mixing is effected in one of a windrow and a Chevron mixing bed.

10. A process according to claim 8 including the step of dividing the mixture from the blending bed into seven fractions in the grading apparatus.

11. A processing according to claim 10 wherein the mixture is divided into a first fraction of a grain size of from 16 mm to 8 mm, a second fraction of a grain size of from 8 mm to 4 mm, a third fraction of a grain size of from 4 mm to 2 mm, a fourth fraction of a grain size of from 2 mm to 1 mm, a fifth fraction of a grain size of from 1 mm to 0.5 mm, a sixth fraction of a grain size of from 0.5 mm to 0.25 mm and a seventh fraction of a grain size of from 0.25 mm to 0 mm.

12. A process according to claim 10 wherein the operation of dividing the mixture into the first six fractions is effected by sieving off, and the seventh fraction by sieving off, and grinding up the undersize grains of at least one of the fractions four, five and six to give dust.

13. A process according to claim 12 wherein the operation of grinding up to form dust is effected in a requirement-discrete mode.

14. A process according to claim 13 wherein the grinding-up operation is effected by way of mutually matched filling level indicators of the dust metering silo of a mill storage bin and homogenization bin.

15. A process according to claim 10 wherein the mixture is sieved off and the fractions accommodated in metering silos, and the metering silos of the first six fractions are charged in an overflow mode.

16. A process according to claim 15 wherein the metering silos are kept in the overflow charge mode by way of filling level indicator means.

17. A process according to claim 15 wherein the feed which is excess for the purposes of the overflow charging operation is passed to the mixing equipment.

18. A process according to claim 1 wherein the mixture grain size fractions are individually accommodated in metering silos which are intended for them.

19. A process according to claim 18 wherein discharge of the mixture grain size fractions from the metering silos to form a dry aggregate is effected volumetrically.

20. A process according to claim 19 wherein discharge of the first six fractions is effected by adjustable-capacity conveyor equipment, and discharge of the seventh fraction is effected by means of control valve means which are adjustable in respect of quantitative throughflow.

21. A process according to claim 20 wherein capacity settings are produced by at least one of setting the speeds of rotation of the conveyor screws, and the frequencies of oscillating conduit movements.

22. A process according to claim 19 wherein the quantitative yield of mixed dry aggregate is regulated.

23. A process according to claim 22 wherein regulation is effected by means of a filling level weighing apparatus which by way of a proportional regulation effect adjusts at least one of the screw speeds of rotation and frequencies of movement, and the positions of the control valve means.

* * * * *